United States Patent [19]

Mylari

[11] 3,883,525
[45] May 13, 1975

[54] THERMAL REARRANGEMENT OF 3-ARYLOXYTRIAZINE-5(4H)-ONES

[75] Inventor: Banavara L. Mylari, Waterford, Conn.

[73] Assignee: Pfizer Inc., New York, N.Y.

[22] Filed: June 13, 1973

[21] Appl. No.: 369,587

[52] U.S. Cl............................. 260/248 AS; 424/249
[51] Int. Cl............................................. C07d 55/10
[58] Field of Search............................ 260/248 AS

[56] References Cited
UNITED STATES PATENTS
3,560,496   2/1971   Howes et al. ....................... 260/248

Primary Examiner—John M. Ford
Attorney, Agent, or Firm—Connolly and Hutz

[57] ABSTRACT

A process for the preparation of 2-aryl-as-triazine-3,5-(2H,4H)-diones of the formula

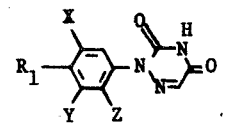

which comprises heating from 200°–350° C. in a reaction-inert solvent a compound of the formula

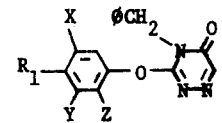

and thereafter removing the benzyl moiety. The products of the present process are useful for controlling coccidiosis in poultry.

5 Claims, No Drawings

THERMAL REARRANGEMENT OF 3-ARYLOXYTRIAZINE-5(4H)-ONES

BACKGROUND OF THE INVENTION

This invention relates to a process for the preparation of 2-aryl-as-triazine-3,5(2H,4H)-diones, a class of compounds having coccidiostatic activity.

In addition to the methods of synthesis reviewed in "The Chemistry of Heterocyclic Compounds," Interscience Publishers, Inc., New York, N.Y. 1956, Volume 10, Chapter 2, 2-aryl-as-triazine-3,5(2H,4H)-diones have been prepared via decarboxylation of the corresponding 2-aryl-6-carboxy-as-triazine-3,5(2H,4H)-diones according to the procedure as taught by Slouka, Ber., 96, 134 (1965).

SUMMARY OF THE INVENTION

It has now been discovered that the preparation of compounds of the formula

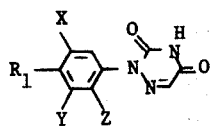

wherein $R_1$ is hydrogen, 2-chlorophenoxy or 2-chloro-4-(N-methyl-N-ethylsulfamoyl)phenoxy;

X is hydrogen or methyl;

Y is hydrogen, methyl or chloro; and

Z is hydrogen or chloro, can be achieved by heating from 200°–350° C. in a reaction-inert solvent a compound of the formula

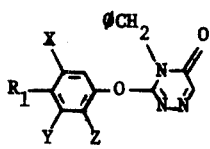

and subsequently removing the blocking group.

The present process offers the advantage in that it can be conducted without the necessity for isolating the intermediate products.

Of particular interest is the process of the present invention conducted in tetraglyme at 220° C. wherein Z is hydrogen and $R_1$ is hydrogen or 2-chloro-4-(N-methyl-N-ethylsulfamoyl)phenoxy. A second preferred feature of the present invention is the removal of the benzyl protecting group by catalytic hydrogenation.

Also included within the scope of the present invention are products wherein $R_1$ is p-alkanoylphenoxy.

DETAILED DESCRIPTION OF THE INVENTION

The aforedescribed reaction is depicted in the following scheme

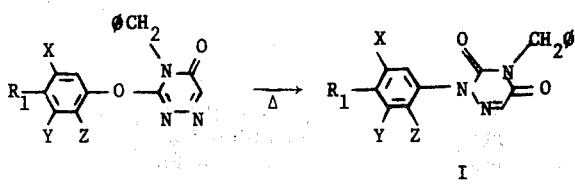

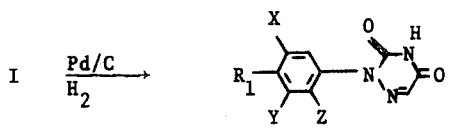

wherein X, Y, Z and $R_1$ are as previously indicated.

The above rearrangement of 3-aryloxy-as-triazine-5(4H)-ones to 2-aryl-as-triazine-3,5(2H,4H)-diones of formula I is effected by heating to elevated temperatures. The temperature ranges employed can vary from 200°–350°C. depending on the inherent stability of the starting compound and product formed; the preferred range is from 200°–300° C.

Reaction time is dependent on the reaction temperature and the reactivity of the appropriate starting material, and can vary from 10–24 hrs.

The thermal reaction can be conducted neat, that is, without a solvent, but it is preferred that a reaction-inert solvent be employed in order to avoid excessive decomposition of the starting compound or product formed. Such solvents are those which, under the conditions of the instant process, do not enter into appreciable reaction either with the starting reagent or product. It is preferred that non-aqueous solvents be employed, although a very small amount of water is tolerated without markedly affecting the yields or purity of the resulting product. It is further preferred that said solvent or combinations thereof have a boiling point in excess of the temperature required to affect the thermal rearrangement. Solvents which meet these requirements for the instantly claimed process and are preferred include heavy mineral oil, hexamethylphosphoramide or tetraglyme (dimethyl ether or tetraethylene glycol).

In addition to employing a solvent for the claimed process to reduce decomposition of the reactant or product, it is preferred that the thermal rearrangement be carried out under the inert atmosphere. For reasons of economy and availability, the preferred inert gas to be employed is nitrogen, while other gases such as helium, neon or argon can also be utilized.

At the conclusion of the rearrangement the inert solvent can be removed under reduced pressure and the intermediate product of formula I isolated and purified by conventional means, or the mixture can be cooled sufficiently to cause the product I to crystallize from the reaction mixture. Alternately, the product I can be debenzylated in the same solvent employed for the thermal rearrangement without being subjected to isolation.

Removal of the protecting group can be achieved either by catalytic hydrogenolysis employing palladium or palladium-on-charcoal and hydrogen at pressures of from atmospheric to 40–45 p.s.i. at ambient temperatures, or by the use of sodium in liquid ammonia. The preferred method is the catalytic method employing hydrogen, the source of which can be tanked hydrogen gas, hydrogen by the reaction of a metal with an acid or hydrogen resulting from the decomposition of hydrazine.

Following the hydrogenation, the spent catalyst is filtered and the product isolated from the filtrate by removal of the solvent under reduced pressure. Alternately, if mineral oil is employed as the solvent the final product can be extracted from the water-immiscible oil employing dilute base, such as 2% sodium hydroxide.

The free acid is obtained by careful acidification of the aqueous extract to pH 5–6. The isolated product can be further purified by recrystallization from an appropriate solvent.

When the product of formula I is isolated from the above described thermal rearrangement reaction it is redissolved in an appropriate solvent prior to the hydrogenolysis. The preferred solvent for the herein described debenzylation reaction is ethanol.

When sodium and liquid ammonia are used for the debenzylation, I is dissolved in the liquid ammonia and at least two equivalents sodium metal in the form of small pieces are added. The ammonia is allowed to evaporate and the residue treated with aqueous acid, the product being isolated by filtration or extraction with an appropriate water immiscible solvent.

The starting 3-aryloxy-as-triazine-5(4H)-ones employed in the instant process are prepared by the following series of reactions:

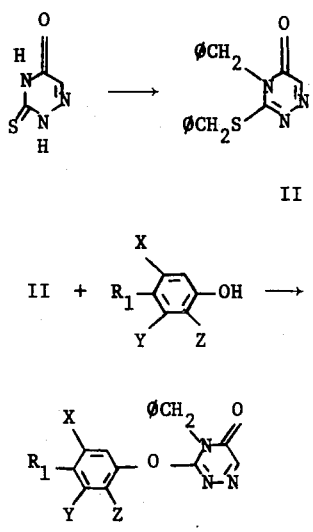

The compounds of formula II are synthesized via dibenzylation of as-triazine-3-thioxo(2H,4H)-5-one followed by displacement of the benzylthio moiety with the requisite phenol.

Experimentally, as-triazine-3-thioxo(2H,4H)-5-one, in an appropriate solvent, is converted to the disodium salt using sodium hydride, and subsequently alkylated with two equivalents of benzyl chloride.

Without isolation, the N,S-dibenzyl compound of formula II is treated with one equivalent of the sodium salt of the requisite phenol prepared in the same solvent.

The 3-aryloxy-as-triazine-5(4H)-one resulting from the displacement of the benzylthio group by the phenolate moiety can be isolated in a manner known to those skilled in the art; for example, by removal of the solvent under reduced pressure or dilution of the reaction mixture with a miscible solvent in which the product has little or no solubility. Alternately, when a solvent is selected for the preparation of the 3-aryloxy-as-triazine-5(4H)-one which is also appropriate for the thermal rearrangement it becomes unnecessary to isolate either the intermediate of formula II or the 3-aryloxy- compound. Further, by selection of the appropriate solvent the synthesis of the final product can be effected without isolation of any of the intermediates, as previously mentioned.

The 2-substituted-as-triazine-3,5-(2H,4H)-diones of the present invention are disclosed in Belgium Pat. No. 773,583. This Belgium patent teaches how to use the triazine products in controlling coccidiosis, a protozoan infection in young poultry.

The examples which follow are given by way of illustration, and are not to be construed as limitations of this invention, many variations of which are possible within the scope and spirit thereof.

EXAMPLE 1

2-(3,5-Dimethylphenyl)-as-triazine-3,5(2H,4H)-dione

To a stirring suspension of 9.6 g. of a 50% sodium hydride-oil mixture in 50 ml. of dry tetraglyme maintained at 5°–10° C. is added a solution of 12.9 g. (0.1 mole) of as-triazine-3-thioxo(2H,4H)-5-one [(Gut, Chem. listy., 51, 1947 (1957)] in 250 ml. of dry tetraglyme. When the evolution of hydrogen ceases 25.2 g. (0.2 mole) of benzyl chloride is added dropwise, and the resulting mixture stirred at 50° C. for 3 hrs.

To the above suspension is added 19.8 g. (0.1 mole) of sodium 3,5-dimethylphenoxide in 50 ml. of the same solvent, and the reaction mixture heated to 45°–50° C. for 2 hrs. and then to 220° C. for 12 hrs. The mixture is cooled, concentrated in vacuo and the residue treated with 250 ml. of ethanol. The mixture is filtered and the filtrate hydrogenated in a hydrogen atmosphere at an initial pressure of 50 p.s.i. in the presence of 2.0 g. of 10% palladium-on-charcoal until the uptake of hydrogen ceases. The catalyst is filtered and the filtrate evaporated to dryness. The crude product is purified by recrystallization from methanol.

EXAMPLE 2

2-(3-Chloro-5-methylphenyl)-as-triazine-3,5(2H,4H)-dione

In a manner similar to Example 1, 6.5 g. (0.05 mole) of as-triazine-3-thioxo(2H,4H)-5-one in 55 ml. of hexamethylphosphoramide is treated with 4.8 g. (0.1 mole) of sodium hydride in an oil suspension and alkylated with 12.6 g. (0.1 mole) of benzyl chloride.

After stirring the reaction mixture for 2 hrs. at 55° C., 10.9 g. (0.05 mole) of sodium 3-chloro-5-methylphenoxide in 30 ml. of the same solvent is added and the mixture heated to 50° C. for 3 hrs. and subsequently to 300° C. for 14 hrs. under a nitrogen atmosphere. The mixture is cooled, poured into a mixture of ice-water and the intermediate extracted with diethyl ether. The ether layer is dried over sodium sulfate and concentrated to dryness in vacuo. The residue is dissolved in 70 ml. of ethanol, added to 1 g. of 10% palladium-on-charcoal and the mixture shaken in a hydrogen atmosphere at an initial pressure of 45 p.s.i. When the uptake of hydrogen ceases the catalyst is filtered and the filtrate removed under reduced pressure. The residual product is recrystallized several times from ethanol.

EXAMPLE 3

2-(3-Methylphenyl)-as-triazine-3,5(2H,4H)-dione

Six and five-tenths grams (0.05 mole) of as-triazine-3-trioxo-(2H,4H)-5-one in 60 ml. of hexamethylphosphoramide is treated with 4.8 g. (0.1 mole) of a 50% sodium hydride-oil suspension followed by 12.6 g. (0.1 mole) of benzyl chloride. After stirring the resulting mixture for 3 hrs. at 50° C., 9.2 g. (0.05 mole) of sodium 3-methylphenoxide is added and the heating continued for an additional 2 hrs. The reaction mixture is cooled and added to 150 ml. of ice-water and the resulting intermediate, 3-(3-methylphenoxy-as-triazine-5(4H)-one extracted with diethyl ether. The ether layer is dried over sodium sulfate and concentrated to dryness under reduced pressure.

The resulting residue is treated with 20 ml. of heavy mineral oil and heated under nitrogen in a Wood's metal bath at 250° C. for 4 hrs. The mixture is cooled and chromatographed on a Florisil packed column using cyclohexane-ether as the eluate. The crude intermediate product is dissolved in 150 ml. of ethanol and added to 1.5 g. of 10% palladium-on-charcoal. The resulting suspension is shaken in a hydrogen atmosphere at an initial pressure of 40 p.s.i. until the hydrogen uptake ceases. The spent catalyst is filtered and the crude product obtained by removal of the solvent under reduced pressure. Further purification is effected by recrystallization from methanolwater.

EXAMPLE 4

2-(3-Chlorophenyl)-as-triazine-3,5(2H,4H)-dione

To a solution of 6.5 g. (0.05 mole) of as-triazine-3-thioxo-(2H,4H)-5-one in 50 ml. of hexamethylphosphoramide is added 4.8 g. (0.1 mole) of a 50% sodium hydride suspension followed, after the evolution of hydrogen ceases, by 12.6 g. of benzyl chloride. The resulting reaction mixture is heated to 55° C. for 3 hrs., is then cooled and added to 100 ml. of water. The intermediate, 3-benzylthio-4-benzyl-as-triazine-5(4H)-one, is extracted with chloroform, and the organic layer subsequently dried over sodium sulfate and concentrated to dryness in vacuo.

Without further purification, the 3-benzylthio-4-benzyl-as-triazine-5(4H)-one, dissolved in 75 ml. of dry tetraglyme, is treated with 11.2 g. (0.05 mole) of sodium 3-chlorophenoxide and the mixture, under a nitrogen atmosphere, heated to 60° C. for 2.5 hrs. and 220° C. for 13 hrs. The mixture is cooled, added to a hydrogenation vessel containing 2.0 g. of 5% palladium-on-charcoal, and the mixture shaken in a hydrogen atmosphere at an initial pressure of 10 p.s.i. until the absorption of hydrogen ceases. The mixture is filtered and the filtrate concentrated under reduced pressure. The residual product is purified to a constant melting point after several recrystallizations from ethanol.

EXAMPLE 5

Employing the requisite starting reagents and repeating the procedure of Example 4, the following triazine congeners are synthesized:

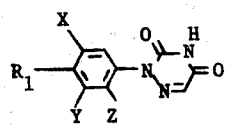

| $R_1$ | X | Y | Z |
|---|---|---|---|
| H | CH₃ | Cl | Cl |
| H | H | Cl | Cl |
| H | CH₃ | CH₃ | Cl |
| H | H | H | H |

EXAMPLE 6

2-(3-Chloro-5-methyl-4-[2-chloro-4-N-methyl-N-ethylsulfamoylphenoxy]phenyl)-as-triazine-3,5(2H,4H)-dione To a solution of 3.1 g. (0.01 mole) of 3-benzylthio-4-benzyl-as-triazine-5(4H)-one in 30 ml. of dry tetraglyme is added 4.1 g. (0.01 mole) of sodium 3-chloro-5-methyl-4-(2-chloro-4-N-methyl-N-ethylsulfamoylphenoxy)phenoxide and the mixture warmed to 55°–60° C. for 2 hrs. The reaction is further heated under a nitrogen atmosphere to 275° C. for 12 hrs. and allowed to cool to room temperature. One gram of 5% palladium-on-charcoal is added, and the resulting suspension shaken in a hydrogen atmosphere until the hydrogen uptake is complete. The catalyst is filtered and the filtrate concentrated in vacuo to a semi-solid product which is further purified by repeated recrystallization from methanol.

EXAMPLE 7

In a similar manner, employing the appropriate starting materials and repeating Example 6, the following compounds are prepared:

2-(4-[2-chloro-4-N-methyl-N-ethylsulfamoylphenoxy]phenyl)-as-triazine-3,5(2H,4H)-dione;   2-(2-chloro-4-[2-chloro-4-N-methyl-N-ethylsulfamoylphenoxy]phenyl)-as-triazine-3,5(2H,4H)-dione;   2-(3-methyl-4-[2-chloro-4-N-methyl-N-ethylsulfamoylphenoxy]phenyl)-as-triazine-3,5(2H,4H)-dione, 2-(4-[2-chlorophenoxy]phenyl)-as-triazine-3,5(2H,4H)-dione and 2-(3-chloro-5-methyl-4-[2-chlorophenoxy]phenyl)-as-triazine-3,5(2H,4H)-dione.

EXAMPLE 8

2-(3-Methylphenyl)-as-triazine-3,5(2H,4H)-dione

The procedure of Example 3 is repeated, with the exception that the intermediate product, 2-(3-methylphenyl)-4-benzyl-as-triazine-3,5(2H,4H)-dione, isolated from a Florisil packed column, is added to approximately 125 ml. of liquid ammonia and treated with 2.3 g. of small pieces of sodium metal. The mixture is allowed to evaporate and the residue is treated with 5 ml. of ethanol followed by 50 ml. of water. The resulting mixture is made acid to pH 3 and the semi-solid product filtered and recrystallized from ethanol.

PREPARATION A

Sodium Phenoxides

I. Sodium 3-Chloro-5-methyl-4-(2-chloro-4-N-methyl-N-ethylsulfamoylphenoxy)phenoxide 1. 2,2'-Dichloro-4-nitro-6-methyldiphenyl ether To a stirred suspension of 11.5 g. (0.293 mole) of sodium hydride in 100 ml. of dry dimethylformamide is added, under a nitrogen atmosphere, 37.5 g. (0.293 mole) of o-chlorophenol in 150 ml. of the same solvent at such a rate that the temperature does not rise above 40° C. When the evolution of hydrogen ceases, 31.0 g. (0.267 mole) of 3,4-dichloro-5-methylnitrobenzene in 70 ml. of dry dimethylformamide is rapidly added, and the resulting reaction mixture heated to 130° C. for 4 hrs. Approximately one-half the solvent is removed in vacuo and the residue poured into 4 l. of ice-water. The resulting precipitate is washed successively with water, 10% potassium hydroxide solution, water and hexane. The solids are air dried and employed in subsequent reactions without further purification.

2. 2,2'-Dichloro-4-nitro-4'-chlorosulfonyl-6-methyldiphenyl ether

Twenty-five grams of 2,2'-dichloro-4-nitro-6-methyldiphenyl ether in 100 ml. of methylene chloride is treated dropwise with 48 ml. of chlorosulfonic acid and the resulting dark solution allowed to stir at room temperature overnight.

The solvent is removed under reduced pressure, and the residue added to 200 ml. of ice-water layered over with 500 ml. of diethyl ether. The organic phase is dried over sodium sulfate and concentrated to a brown solid which is slurried in hexane and filtered. The intermediate product is used without further purification.

3. 2,2'-Dichloro-4-nitro-4'-N-methyl-N-ethylsulfamoyl-6-methyldiphenyl ether

A solution of 2 g. of 2,2'-dichloro-4-nitro-4'-chlorosulfonyl-6-methyldiphenyl ether in 50 ml. of methylene chloride is treated with a solution of 2 ml. of methyl ethyl amine in 10 ml. of the same solvent. After stirring for 30 min. the solvent is removed in vacuo and the residue triturated in water. The solids are filtered, dried, and employed in the subsequent reduction reaction without further purification.

4. 2,2'-Dichloro-4-amino-4'-N-methyl-N-ethylsulfamoyl-6-methyldiphenyl ether

To a stirring solution of 2.2 g. (5 m moles) of 2,2'-dichloro-4-nitro-4'-N-methyl-N-ethylsulfamoyl-6-methyldiphenyl ether in 20 ml. of ethanol at room temperature is added dropwise a solution of 5.38 g. (4 m moles) of stannous chloride hydrate in 8.7 ml. of 12N hydrochloric acid. The resulting suspension is stirred at room temperature for 96 hrs., after which the ethanol is removed under reduced pressure and the residual material is slurried in 200 ml. of water to which is added sufficient 10% potassium hydroxide solution to provide a pH of 9. The solids, which are washed with water and then with hexane, are dried and recrystallized from isopropanol.

5. 3-Chloro-4-(2-chloro-4-N-methyl-N-ethylsulfamoylphenoxy)-5-methylphenol

To a mixture of 6.2 ml. (0.075 mole) of 12N hydrochloric acid and an equal amount of water is added 10.4 g. (0.025 mole) of 2,2'-dichloro-4-amino-4'-N-methyl-N-ethylsulfamoyl-6-methyldiphenyl ether. The mixture is cooled to 0° C., and a cold solution of 1.73 g. (0.025 mole) of sodium nitrite is added slowly, the temperature being kept near 0° C. The diazotized solution is filtered through a cold sintered-glass filter and subsequently treated with a cold solution of 3.5 g. (0.034 mole) of ammonium fluoborate in 120 ml. of water with vigorous stirring. The precipitate is stirred in the cold for 30 min., filtered and washed with 2.5 ml. of cold 5% ammonium fluoborate solution, 3.0 ml. of cold methanol and several 5.0 ml. portions of diethyl ether.

The diazonium fluoborate is heated gently with 20 ml. of glacial acetic acid until the nitrogen evolution ceases. The solvent is removed under reduced pressure and the residue partitioned between chloroform and water. The organic phase is separated, dried over sodium sulfate and concentrated to dryness to provide the crude 2,2'-dichloro-4-acetoxy-4'-N-methyl-N-ethylsulfamoyl-6-methyldiphenyl ether.

The above acetate in 10 ml. of ethanol is treated with 6.5 ml. of 10% aqueous potassium hydroxide and the resulting mixture heated for one hour. The solution is concentrated under reduced pressure, made acid with dilute sulfuric acid and filtered. The crude phenol is purified by recrystallization from methanol-water.

6. Sodium 3-chloro-4-(2-chloro-4-N-methyl-N-ethylsulfamoylphenoxy)-5-methylphenoxide To a solution of 4.18 g. (0.01 mole) of the above phenol in 40 ml. of methanol is added 550 mg. (0.011 mole) of sodium methoxide in 4 ml. of the same solvent. The hazy suspension is allowed to stir for 10 min., and is then filtered. The solvent is removed in vacuo and the sodium salt triturated with a small amount of pentane and filtered.

II. The following phenols, not previously reported in the chemical literature, are synthesized from the appropriate starting materials employing the general procedure of Preparation (AI 1–5), and subsequently converted to their sodium salts following the procedure of Preparation (AI 6):

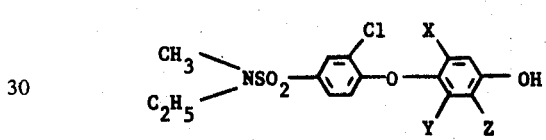

| X | Y | Z |
|---|---|---|
| H | H | H |
| H | H | Cl |
| H | CH₃ | H | and

| X | Y | Z |
|---|---|---|
| H | H | H |
| CH₃ | Cl | H |

What is claimed is:

1. A process for the preparation of a compound of the formula

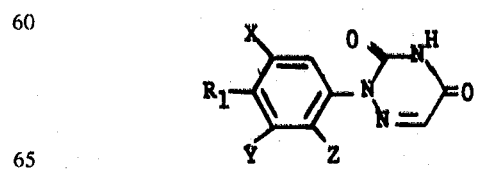

wherein

R₁ is selected from the group consisting of hydrogen, 2-chlorophenoxy and 2-chloro-4-(N-methyl-N-ethylsulfamonyl) phenoxy;

X is selected from the group consisting of hydrogen and methyl;

Y is selected from the group consisting of hydrogen, methyl and chloro; and

Z is selected from the group consisting of hydrogen and chloro, which comprises heating from 200°–350°C. in a reaction-inert solvent a compound of the formula

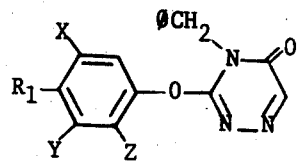

and thereafter removing the protecting group by catalytic hydrogenolysis at a pressure of from atmospheric to 45 psi at ambient temperature wherein said catalyst is palladium or palladium-on-charcoal.

2. The process of claim 1 wherein $R_1$ and Z are each hydrogen.

3. The process of claim 2 wherein X and Y are each methyl.

4. The process of claim 2 wherein X is methyl and Y is chloro.

5. The process of claim 1 wherein X, Y and Z are each hydrogen and $R_1$ is 2-chloro-4-(N-methyl-N-ethylsulfamoyl)phenoxy.

* * * * *